United States Patent [19]
Schrems

[11] Patent Number: 6,080,273
[45] Date of Patent: *Jun. 27, 2000

[54] METHOD AND DEVICE FOR TREATING LIQUIDS BY PARTIAL EVAPORATION

[76] Inventor: Martin Schrems, 127 Town View Dr., Wappingers Falls, N.Y. 12590

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,735

[22] Filed: Jul. 23, 1997

[30] Foreign Application Priority Data

Jul. 23, 1996 [AT] Austria ................................. 1326/96

[51] Int. Cl.[7] ................................. B01D 1/22; B01D 3/10
[52] U.S. Cl. ........................... 159/13.1; 159/14; 159/15; 159/26.2; 159/43.1; 159/49; 159/DIG. 16; 202/205; 202/236; 203/89; 203/91
[58] Field of Search ......................... 159/2.1, 13.1–13.3, 159/14–15, 26.2, 49, 43.1, DIG. 16, 44; 203/1, 88, 89, 91; 202/205, 236; 122/39; 165/115, 116

[56] References Cited

U.S. PATENT DOCUMENTS

| | | | |
|---|---|---|---|
| 909,028 | 1/1909 | Schalitz | 159/15 |
| 1,424,998 | 8/1922 | Fenton | 159/15 |
| 2,041,059 | 5/1936 | French | 159/15 |
| 2,176,498 | 10/1939 | Hickman | 159/15 |
| 3,214,349 | 10/1965 | Kehoe et al. | 159/15 |
| 3,368,330 | 2/1968 | Elliot et al. | 159/15 |
| 3,536,591 | 10/1970 | Lotz | 202/174 |
| 3,620,283 | 11/1971 | Brown | 202/236 |
| 4,199,398 | 4/1980 | Eukin et al. | 159/13.1 |
| 4,303,479 | 12/1981 | Church et al. | 203/89 |
| 5,334,290 | 8/1994 | Nuns et al. | 202/205 |
| 5,395,483 | 3/1995 | Al-Hawaj | 203/88 |
| 5,419,814 | 5/1995 | Kunihiro et al. | 202/236 |

FOREIGN PATENT DOCUMENTS

| | | | |
|---|---|---|---|
| 595597 | 12/1947 | United Kingdom | 202/236 |

*Primary Examiner*—Virginia Manoharan
*Attorney, Agent, or Firm*—Herbert L. Lerner; Laurence A. Greenberg; Werner H. Stemer

[57] ABSTRACT

A process and a device for treating a liquid by separating out constituents contained in the liquid. Pollutants are removed or the liquid is sterilized by partial evaporization. The liquid is introduced into a vacuum tank in which a portion thereof is evaporated. The remaining liquid phase is discharged from the vacuum tank. The liquid in the vacuum tank flows under the effect of gravity on a fixed inclined or horizontal surface on which it forms a liquid film. The vapor phase emerges from the liquid film as a function of the vapor pressure defined relative to the prevailing temperature. The flow surface slopes downwardly away from the inflow of the liquid, it rises slightly or it extends horizontally.

4 Claims, 6 Drawing Sheets

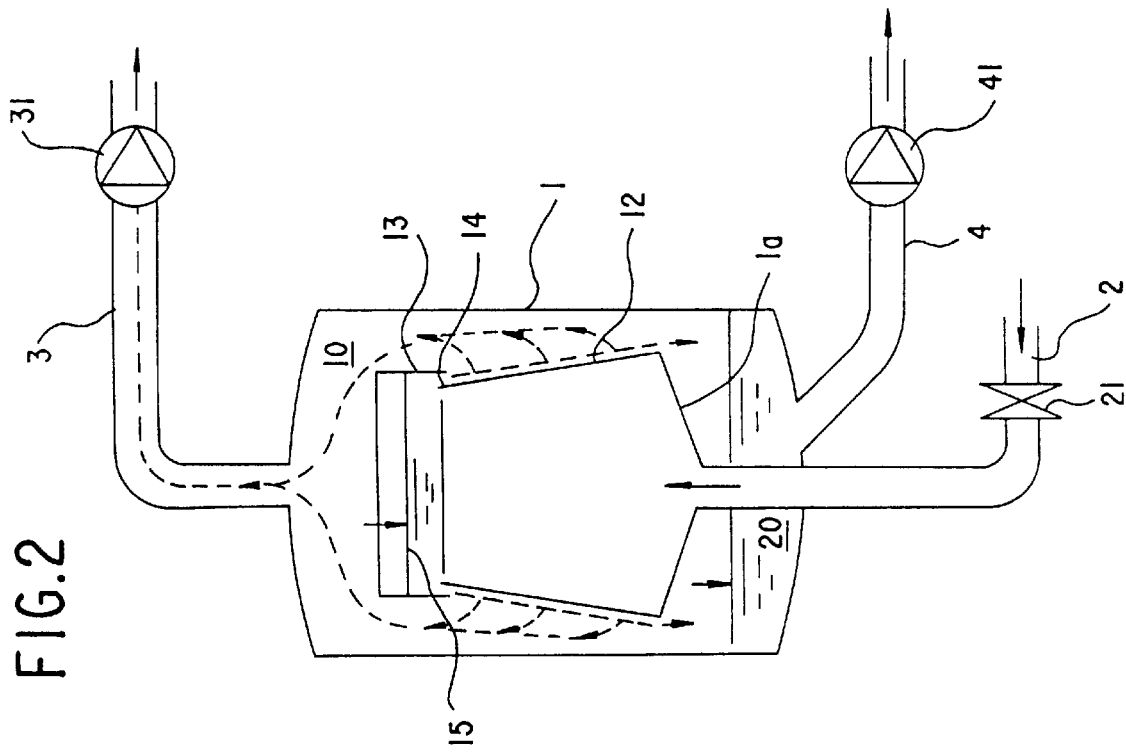
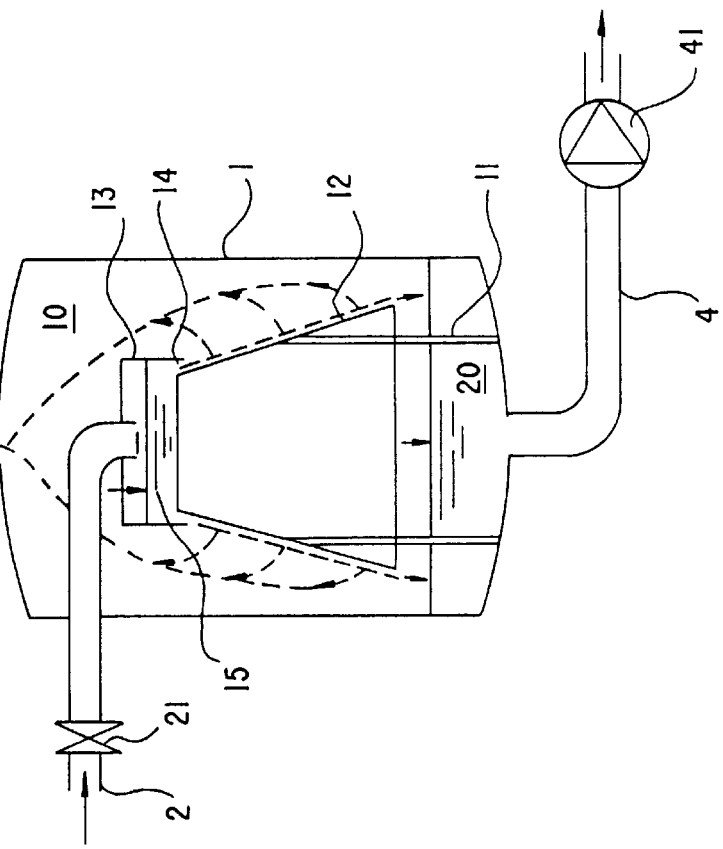

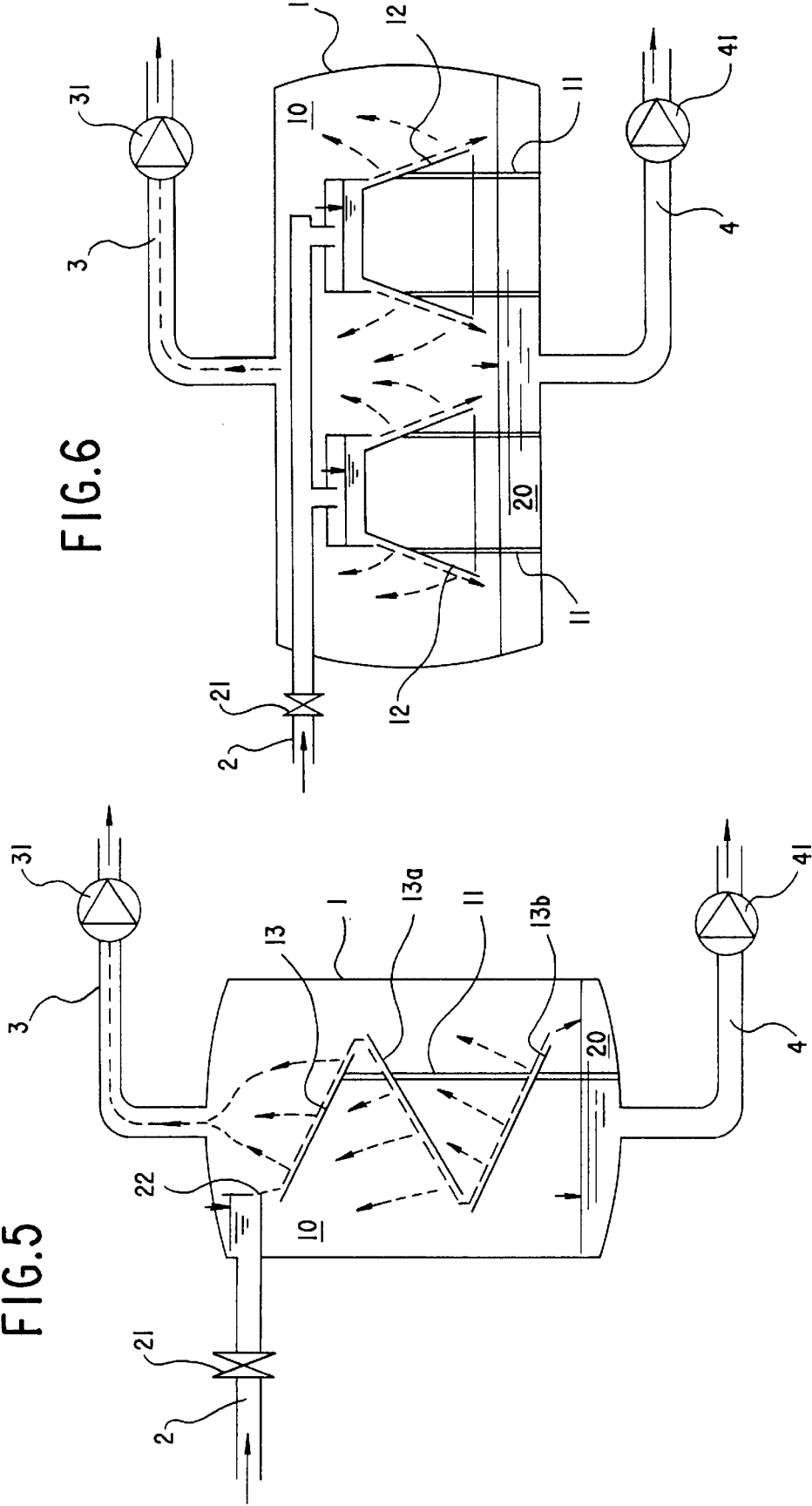

METHOD AND DEVICE FOR TREATING LIQUIDS BY PARTIAL EVAPORATION

BACKGROUND OF THE INVENTION

1. Field of the Invention

The invention pertains to the treatment of liquids. More specifically, the invention relates to a method and a device for treating a liquid, in particular for separating different constituents contained in the liquid, for removing pollutants from the liquid or for sterilizing the liquid. The liquid is thereby introduced into a vacuum tank in which a part thereof is evaporated, and the remaining part thereof is discharged from the vacuum tank, the liquid in the vacuum tank flowing under the effect of gravity to a fixed surface on which a liquid film develops from which the vaporous phase emerges.

It has been known heretofore from Austrian patent AT-PS 377 244 to remove pollutants from a liquid by spraying the liquid in to a vacuum tank. As a result, those constituents contained in the liquid, which have a lower boiling point than the liquid itself, are evaporated, thus bringing about the desired separation. Using this method, furthermore, owing to the fact that azeotropic mixtures develop, pollutants whose boiling point is higher than that of the liquid can be extracted from the liquid with the vaporous phase.

However, this previously known method does not, in many respects, meet all the requirements:

In order to achieve the desired small droplet size, the liquid must be passed through a spraying nozzle at a high pressure, and a pump must be provided for this purpose. This causes additional outlay in setting up a plant to carry out the method. Additionally, further operating costs are incurred by the pump.

Furthermore, due to the fact that the liquid is sprayed upwards, the droplets being ejected collide with the descending droplets. As a result, they combine to form larger droplets and the degree of efficiency of the process is diminished.

Furthermore, since the droplets sprayed out are only subjected to the vacuum for a short time and then collect at the bottom of the tank, the vacuum prevailing in the tank acts only on that part of the liquid which is located at the surface of the liquid collected in the tank, as a result of which only a low degree of efficiency can likewise be achieved.

Furthermore, devices are known from German patent publication DE-A 29 27 661, from international publication WO 94/25132, and from European patent publication EP-A 166 790, with vacuumized tank into which liquids to be treated are introduced and then vaporized in the tank. For this purpose, the liquids flow along vertical surfaces within the tank, during which process they are subjected to the vacuum.

Those prior art devices, however, have in common a very poor degree of efficiency. This is mostly due to the fact that the liquid flowing along the surfaces has a very short residence time and the liquid is exposed only briefly to the vacuum because the surfaces are disposed vertically.

SUMMARY OF THE INVENTION

It is accordingly an object of the invention to provide a process and device for treating liquids, in particular for separating various constituents of the liquid, which overcomes the above-mentioned disadvantages of the heretofore-known processes and devices of this general type and which improves the efficiency of separation considerably as compared to the comparable prior art processes and devices.

With the foregoing and other objects in view there is provided, in accordance with the invention, a process for treating a liquid, which comprises the steps of: providing a vacuum tank with a non-vertical flow surface; introducing a liquid into the vacuum tank and forming a liquid film on the flow surface; and evaporating a portion of the liquid out of the liquid film into a vapor phase in the vacuum tank and discharging a remaining portion of the liquid in liquid phase from the vacuum tank.

In accordance with an essential feature of the invention, the liquid film is formed on a flow surface which is downwardly inclined away from an inflow opening where the liquid is introduced into the vacuum tank, it is horizontal, or it is slightly upwardly inclined away from the inflow of the liquid.

The invention is based on the finding that the effect of a vacuum acting on a liquid is substantially improved if the surface of the liquid subjected to the vacuum is increased or if the residence time of those proportions of the liquid which are subjected to the vacuum is increased. As a result, a far better separation effect can be brought about.

The liquid is preferably conducted through an annular gap onto a conical, conoidal, double-conoidal, hemispherical or cylindrical surface. As an alternative thereto, the liquid may be conducted through a slot-shaped gap onto the flat surface or surfaces.

Since, owing to the great increase in volume at the transition of the liquid phase into the vapor phase, the bacteria contained therein are destroyed, thus resulting in their sterilization, a method of this type can also be used for sterilizing liquids.

The liquids are not subjected to any major mechanical stresses and, accordingly, they are not damaged. For this reason, liquids which are sensitive to mechanical stresses, such as milk or fruit juices, can be sterilized using the novel process and device.

With the above and other objects in view, there is also provided, in accordance with the invention, a device for treating a liquid, comprising: a tank having an interior defining a process chamber with a bottom and an upper region; an inflow pipe communicating with the interior for introducing a liquid into the process chamber, and an outflow pipe communicating with the bottom for withdrawing liquid collecting on the bottom of the process chamber; a nonvertical flow surface formed in the process chamber onto which the liquid flows from the inflow pipe and on which the liquid forms a liquid film for evaporation to a vapor phase of a portion of the liquid; and an extraction pipe communicating with the upper region for extracting from the process chamber the vapor phase and with a vacuum source for subjecting the process chamber to a vacuum.

In accordance with an added feature of the invention, the non-vertical flow surface extends obliquely downward from the inflow pipe towards the bottom, it extends substantially horizontally, or slightly obliquely upward away from the inflow pipe.

In accordance with again an added feature of the invention, the inflow pipe issues into a gap through which the liquid enters onto the flow surface.

In accordance with a preferred feature of the invention, the inflow pipe opens into at least one intermediate tank which is disposed at its bottom with an outlet gap for the liquid and which is adjoined by the flow surface. According to preferred embodiments, the at least one intermediate tank is open at its top and a level control device is arranged therein. The level control device controls a valve in the inflow line and thus controls the amount of liquid entering the process chamber.

The flow surface may have a conical, conoidal, double-conoidal, hemispherical or cylindrical shape. In this case, it may be formed by the outer wall of a tank which is open at its top, to which the at least one inflow pipe is connected, and in which the liquid rises. Furthermore, the at least one surface may be designed to be flat, in which case preferably a plurality of surfaces adjoin one another disposed at acute angles relative to one another. Furthermore, the tank may be designed, at the mouth of the at least one inflow pipe, with at least one inlet gap which is adjoined by the at least one surface.

Other features which are considered as characteristic for the invention are set forth in the appended claims.

Although the invention is illustrated and described herein as embodied in a process and device for treating liquids, in particular for separating out various constituents from the liquid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1 to 6 show six embodiments of the device according to the invention, each in vertical section and partly schematic;

DESCRIPTION OF THE PREFERRED EMBODIMENTS

Figure 3:
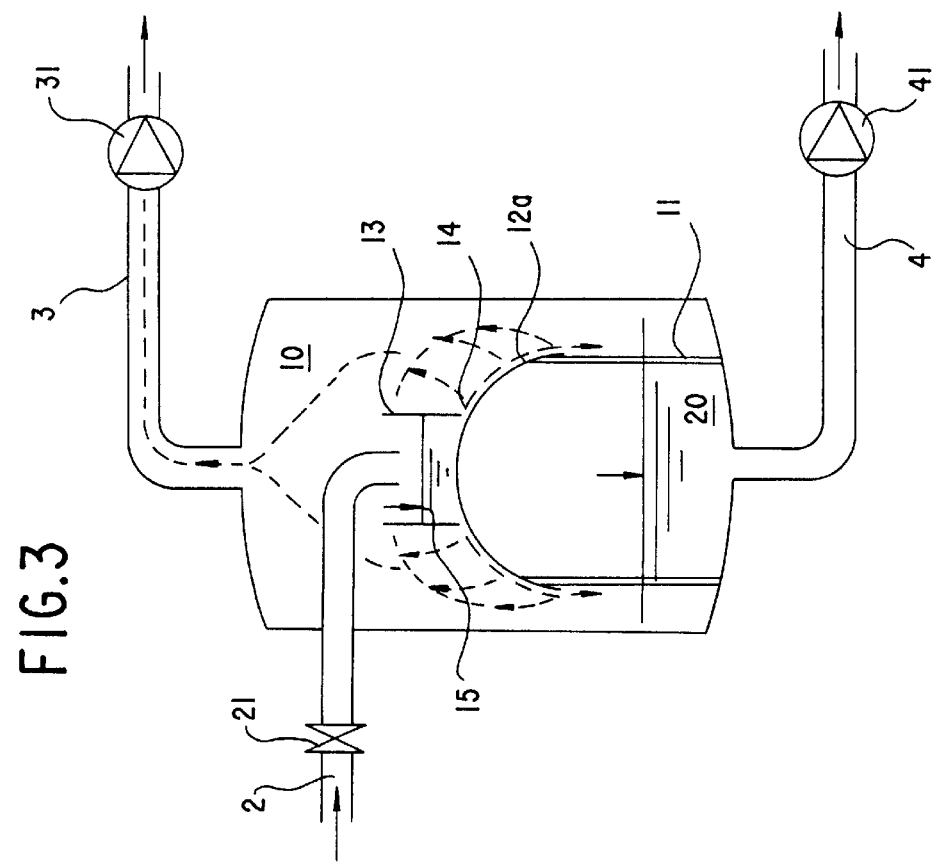

Referring now to the figures of the drawing in detail and first, particularly, to FIG. 1 thereof, there is seen a tank or process container 1 with an inflow line 2, an extraction line 3, and an outflow line 4. A control valve 21 is disposed in the inflow line 2. A suction pump 31 is disposed in the extraction line 3 by means of which a vacuum is produced in the process chamber in the interior 10 of the tank 1. A vacuum pump 31 may be used as the suction pump. A pump 41 is located in the outflow line 4 by means of which liquid 20 collecting at the bottom of the tank 1 is discharged out of the latter. The vacuum in the tank 1 is adjusted in accordance with the given temperature so that it is near the boiling pressure of the liquid. The vapor pressure of water or aqueous solutions, for example, at room temperature (20° C.), is about 23 mbar to 24 mbar (listed 23.33 Pa=17.5 mm Hg).

The vapor phase is fed to a condenser in which it is converted to a liquid phase. If the suction capacity of the condenser is sufficiently great, it may not be necessary to use the suction pump. As a less expensive alternative to a suction pump, a simple ventilator may be used.

A conical surface 12 carried by supports 11 is disposed in the interior 10 of the tank 1. At the upper end of the conical surface 12 there is arranged a hollow cylinder 13 into which the inflow pipe 2 issues. An annular gap 14 is formed between the hollow cylinder 13 and the conical surface 12. A level control device 15 is assigned to the hollow cylinder 13. The output of the level control device 15 is connected to the control valve 21. The width of the gap 14 is adjustable.

The device operates as follows:

A liquid from which pollutants are to be extracted or which is to be sterilized is introduced through the line 2 into the tank 1. The liquid passes into the region of the hollow cylinder 13 from which it flows solely under the effect of gravity through the gap 14. A liquid film is formed as the liquid exits from the gap 14 and onto the conical surface 12. A vacuum is produced in the interior 10 of the tank 1 by means of the suction pump 31. By virtue of the vacuum acting on the liquid film flowing along the conical surface 12, proportions of the liquid change to the vapor phase. These are, in particular, pollutants which are contained in water and whose boiling point is lower than that of the liquid. Owing to the molecular combination with the pollutants, the so-called azeotropy, these can also be discharged from the liquid together with the gaseous molecules of the liquid. The vapor phase extracted is converted into the liquid phase in a non-illustrated adjoining condenser. If the suction capacity of the condenser is large enough, the suction pump can be replaced by a ventilator, or can be completely omitted.

Furthermore, by the enormous increase in volume which is brought about during the transition of portions of the liquid into the vapor phase, bacteria are destroyed, also resulting in sterilization of the liquid. Owing to the fact that the vacuum acts on the liquid film flowing over the conical surface 12, as a result of which the vacuum acts on a large surface or since the liquid film is subjected to the vacuum over a relatively long period, a very high degree of efficiency is achieved. Because of the gentle treatment of the liquid, it is not damaged, which means that liquids such as milk or fruit juices which are sensitive to mechanical stresses can also be sterilized using this method.

The liquid 20 which collects at the bottom of the tank 1 and which has been freed from pollutants or has been sterilized is conducted through the outflow line 4.

FIG. 2 illustrates a device of this type which differs from the device according to FIG. 1 by the fact that the inflow line 2 opens from the bottom into an intermediate tank 1a which is arranged in the interior 10 of the tank 1 and is formed on its exterior with the conical flow surface 12.

FIG. 3 illustrates a device of this type which differs from the device according to FIG. 1 by the fact that the flow surface 12a is a hemispherical surface.

Figure 4:
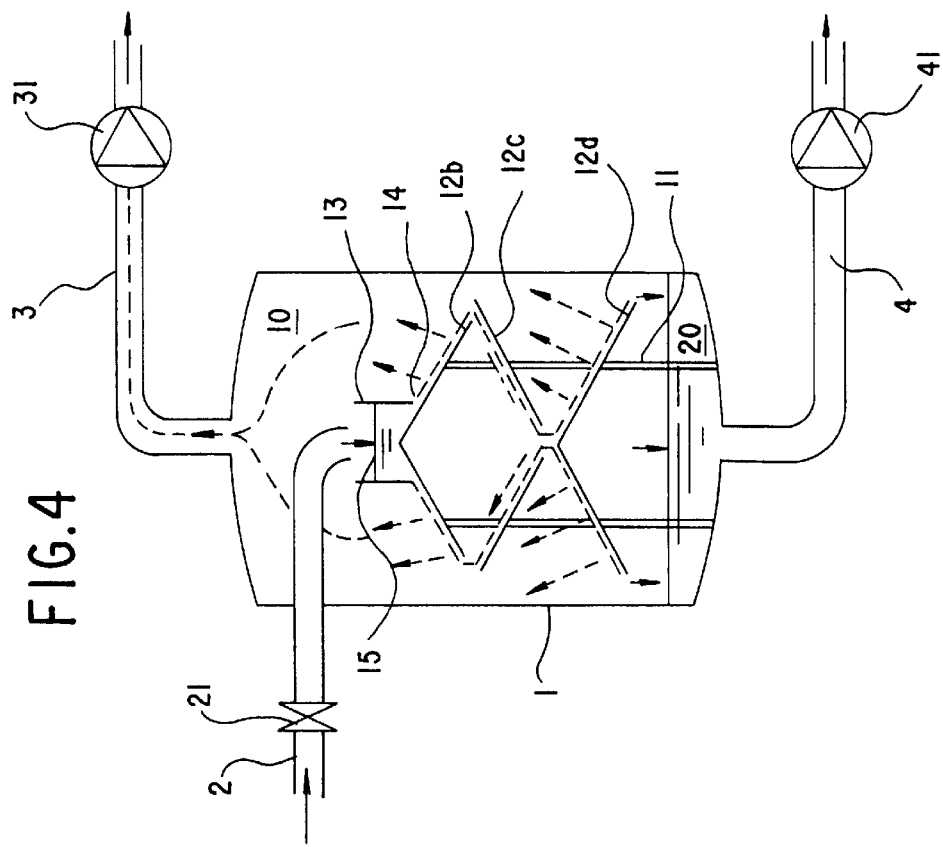

FIG. 4 illustrates a device in which the exposure area defined by the flow surface is considerably enlarged as compared to the previously shown embodiments. The flow surface is formed by three conical, or conoidal, and mutually adjoining surfaces 12b, 12c and 12d.

FIG. 5 illustrates a device of this type which differs from the device according to FIG. 1 by the fact that the flow surface is formed by three mutually adjoining flat surfaces 13, 13a and 13b. The liquid film is thus formed along a meandering path starting from the gap 22, onto the surface 13 and past the surfaces 13a and 13b, before the cleansed liquid phase collects at 20.

FIG. 6 illustrates a device of this type which differs from the device according to FIG. 1 by the fact that the tank 1 is elongated and there are disposed in its interior 10 two conical flow surfaces 12. This embodiment, therefore, provides for a further increase in the flow surface.

Figure 7:
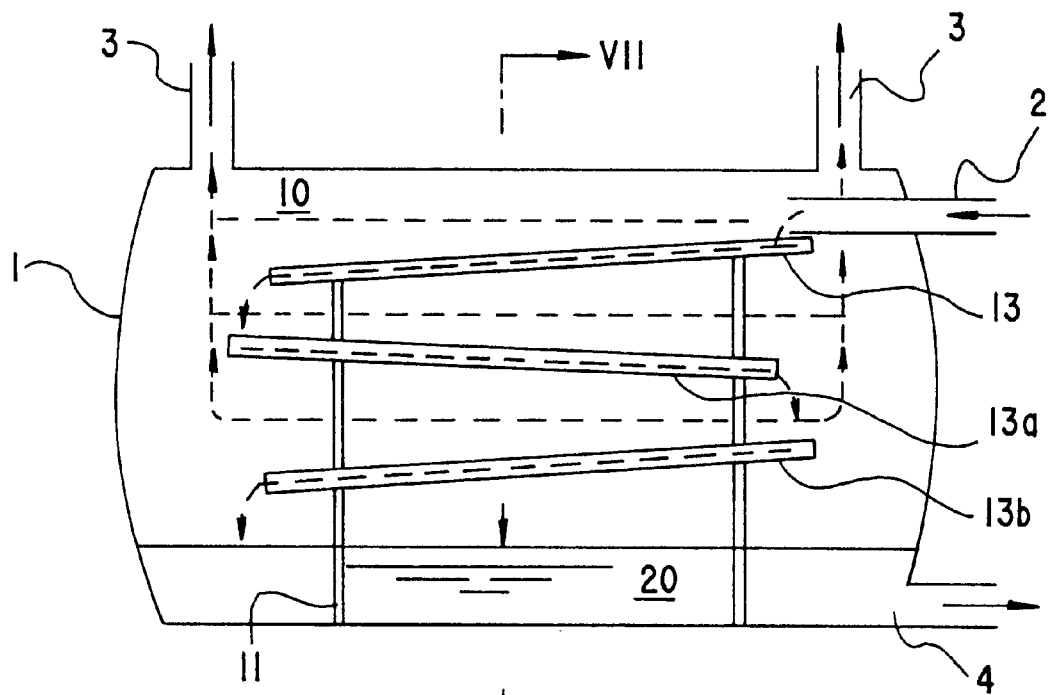
FIG. 7 is a vertical section of a seventh embodiment of the device according to the invention.
Figure 7A:
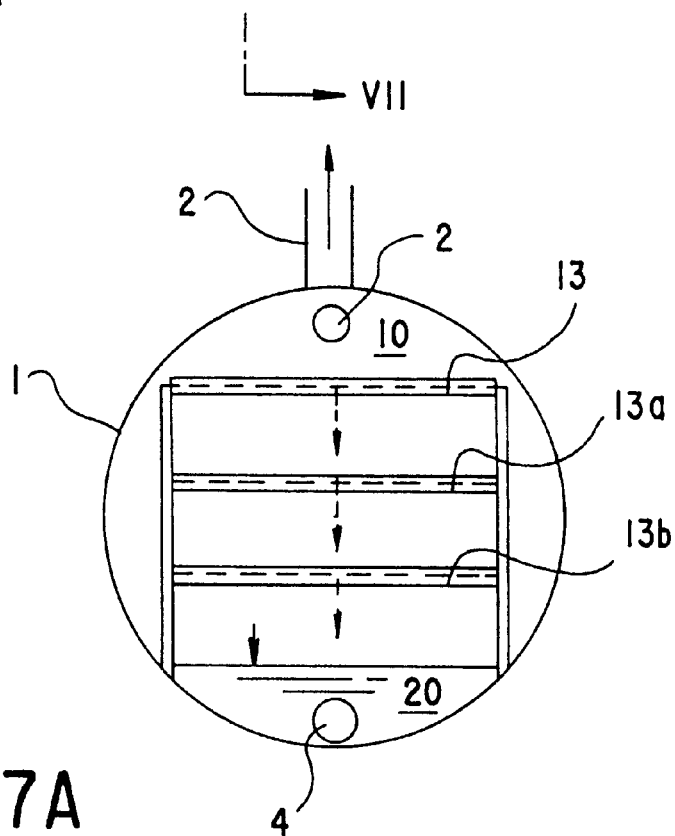
FIG. 7A is a section taken along the line VII—VII of FIG. 7 and viewed in the direction of the arrows.

FIGS. 7 and 7A illustrate a device of this type which differs from the device according to FIG. 6 by the fact that the tank 1 is provided with extended flow surfaces 13, 13a, 13b. As a result, the residence time of the liquid film in the tank 1 is increased. In this case, the vapor phases are extracted through two lines 3.

In all these exemplary embodiments, the flow surface is rigidly fixed, and the liquid flows solely on the effect of gravity, i.e., the liquid flows along the inclined surfaces.

Figure 8:
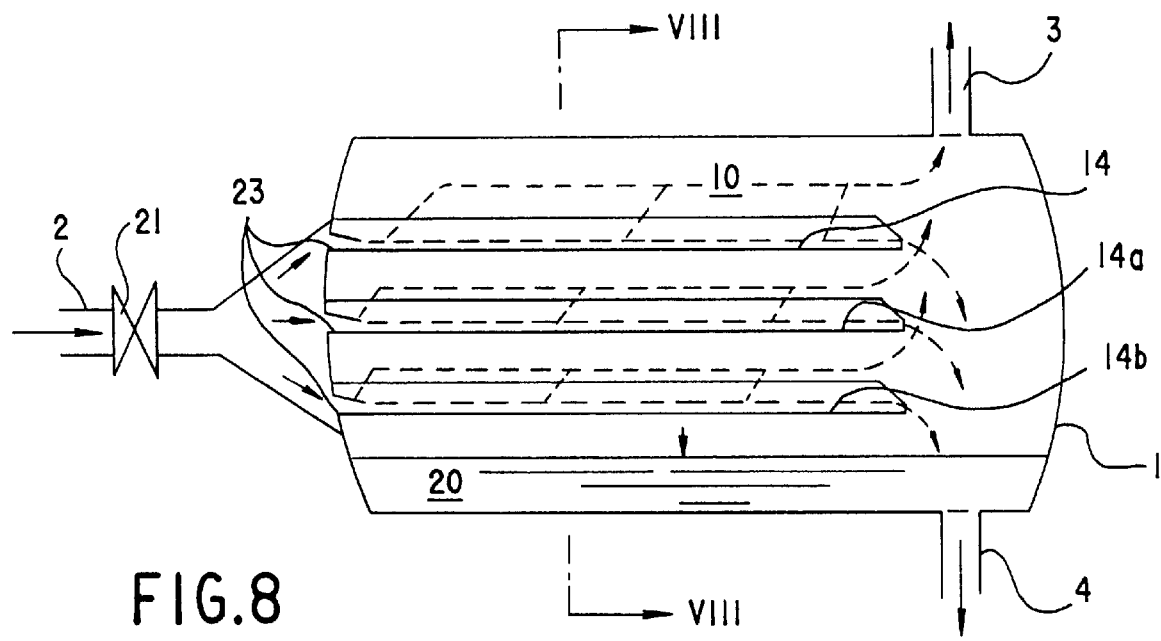
FIG. 8 is a vertical section of an eighth embodiment of the device according to the invention.
Figure 8A:
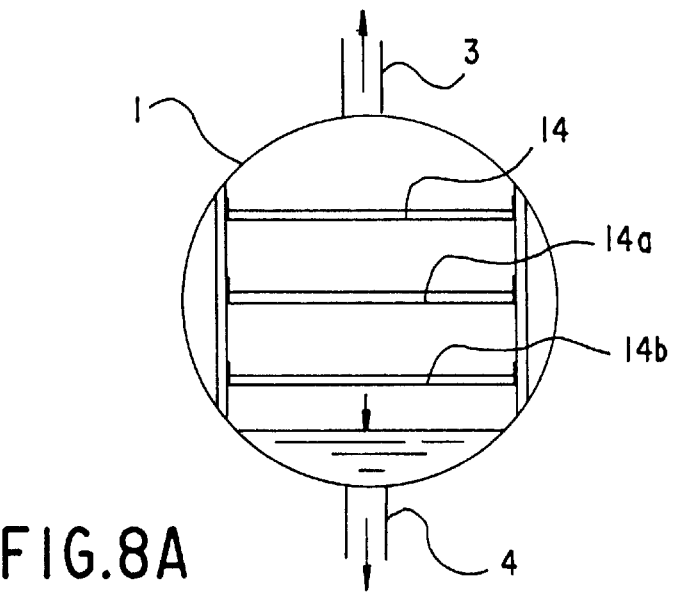
FIG. 8A is a section taken along the line VIII—VIII of FIG. 8 and viewed in the direction of the arrows.

FIGS. 8 and 8A illustrate a device of this type which differs from the device according to FIGS. 7 and 7A by the fact that the tank 1 is formed with three slot-shaped inflow openings 23 or inlet gaps 23 at which the inflow line 2 issues. Three flat surfaces 14, 14a and 14b along which the liquid film flows adjoin the openings 23. The fact that a plurality of inlet gaps 23 are provided permits an increased throughflow of liquid without increasing the size of the tank 1.

It will be appreciated that the surfaces which are provided in the tank 1, onto which the liquid is fed and on which a liquid film develops can also be disposed horizontally or even rise slightly away from the inflow side. The inclination of the surfaces which slope downward or upward may be up to 10° relative to the horizontal. The main factor to achieve a high degree of efficiency is that a liquid film with a maximum in exposure surface is produced inside the tank, and that the liquid film is exposed to the vacuum prevailing in the tank 1 as long as possible. Of course, more or less than three parallel surfaces can be used in FIG. 8. The larger the number of parallel flow surfaces, the larger the throughput will be for a given foot print.

Figure 9:
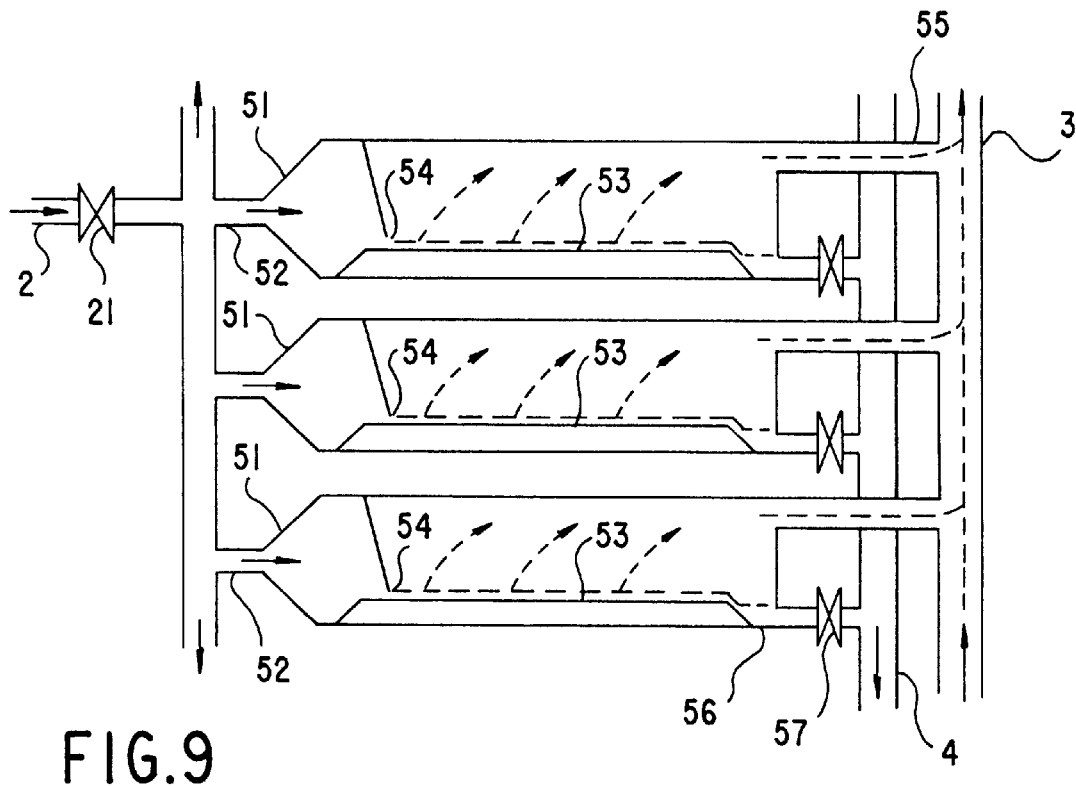
FIG. 9 is a vertical section of a ninth embodiment of the invention.

FIG. 9 illustrates a device of this type, in which a plurality of cylindrical tanks 51, such as three, are provided, which are aligned approximately horizontally and to which a liquid is fed via individual lines 52 via a common inflow line 2 in which there is a valve 21. Flat surfaces 53 are located in the tanks 51 which slope slightly downward or slightly upward. The liquid is supplied to the flat surfaces 53 through respective gaps 54. By virtue of the vacuum prevailing in the tanks 51, the vapor phase emerges from the thin liquid film located on the surfaces and is fed via extraction lines 55 to the common extraction line 3. The cleansed liquid, on the other hand, flows via lines 56, with inline valves 57, into the common outflow line 4.

Figure 10:
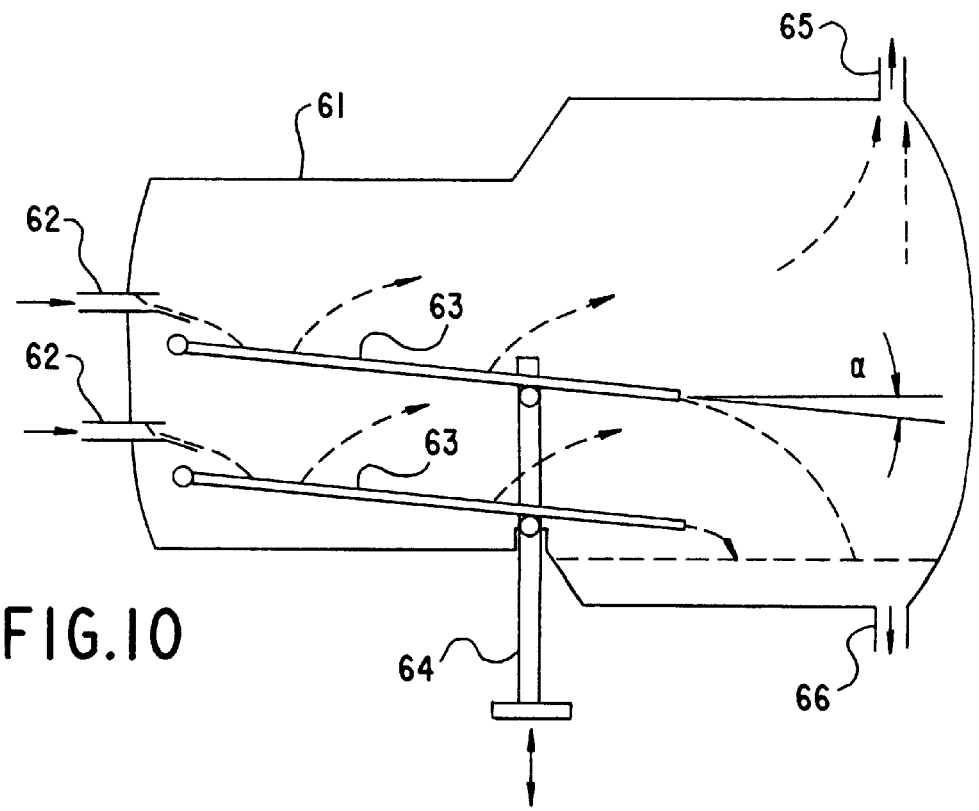
FIG. 10 is a similar view of a tenth embodiment.

FIG. 10 illustrates a device of this type in which there is provided a tank 61 with, for example, two inflow pipes 62. Two flow surfaces 63 are disposed in the tank 61. The surfaces 63 are pivotable as they are articulated at one end and mounted, distally from the articulation pivot, on a vertically movable adjusting device 64. The angle α at which the flow surfaces 63 are inclined relative to the horizontal can be adjusted by the adjusting device 64. Furthermore, the tank 61 is formed with an extraction line 65 through which the vapor phase emerging from the liquid film developing on the flow surfaces 63 is extracted. Additionally, the tank 61 is formed with a line 66 through which the cleaned fluid flows off.

The angle α of the flow surfaces 53 and 63 is typically within 10° relative to horizontal.

By means of the method according to the invention and the device according to the invention, liquids such as water or aqueous solutions can be brought about in a simple manner by removing pollutants contained in the liquid. Additionally, liquids can be sterilized by this means.

In particular, hydrocarbons, such as phenols, aromatic compounds and chlorinated hydrocarbons, can be separated from water in a simple manner using the novel process. Additionally, proportions of crude oil contained in water can be removed using this method, which is significant, in particular, in the recovery of drinking water from processing sea water.

In all cases, the constituents deposited by evaporation can subsequently be condensed and passed on for further use.

Due to the fact that only a proportion of about 0.1 per thousand of the water is also evaporated in the process, a very high degree of efficiency is achieved with comparatively little use of energy. Additionally, the method according to the invention is particularly advantageous because it permits gentle treatment of liquids, which means that milk and fruit juices, for example, can be sterilized using this process without damaging the liquid in any way.

I claim:

1. A process for treating a liquid, which comprises:

introducing a liquid into a tank with a plurality of mutually parallel, flow surfaces, wherein each flow surface is substantially horizontal, upwardy inclined, or downwardly inclined away from an inflow opening;

simultaneously supplying the liquid under vacuum to each of the plurality of flow surfaces to form a liquid film on each of the plurality of flow surfaces by introducing the liquid onto each flow surface through a slot-shaped gap; and evaporating a portion of the liquid out of the liquid film on each of the plurality of flow surfaces into a vapor phase in the tank and discharging a remaining portion of the liquid in liquid phase from the tank.

2. The process according to claim 1, which further comprises separating out pollutants from the liquid in the vapor phase.

3. A device for treating a liquid, comprising:

a tank having an interior defining a process chamber with a bottom and an upper region;

an inflow pipe communicating with said interior for introducing a liquid into said process chamber, and an outflow pipe communicating with said bottom for withdrawing liquid collecting on the bottom of said process chamber;

a plurality of mutually parallel flow surfaces formed in said process chamber, each of said flow surfaces being substantially horizontal, upwardly inclined, or downardly inclined away from said inflow pipe and communicating with said inflow pipe through a slot-shaped opening from which the liquid flows simultaneously onto each flow surface and forms a plurality of liquid films for evaporation to a vapor phase of a portion of the liquid; and an extraction pipe communicating with said upper region for extracting the vapor phase from said process chamber and a vacuum source communicating with said process chamber for subjecting said process chamber to a vacuum.

4. The device according to claim 3, wherein said flow surfaces are inclined relative to horizontal by an angle of maximally 10°.

* * * * *